No. 684,958. Patented Oct. 22, 1901.
J. H. THOMPSON & T. P. McCULLOUGH.
TIRE SHRINKER.
(Application filed Nov. 27, 1900.)
(No Model.)
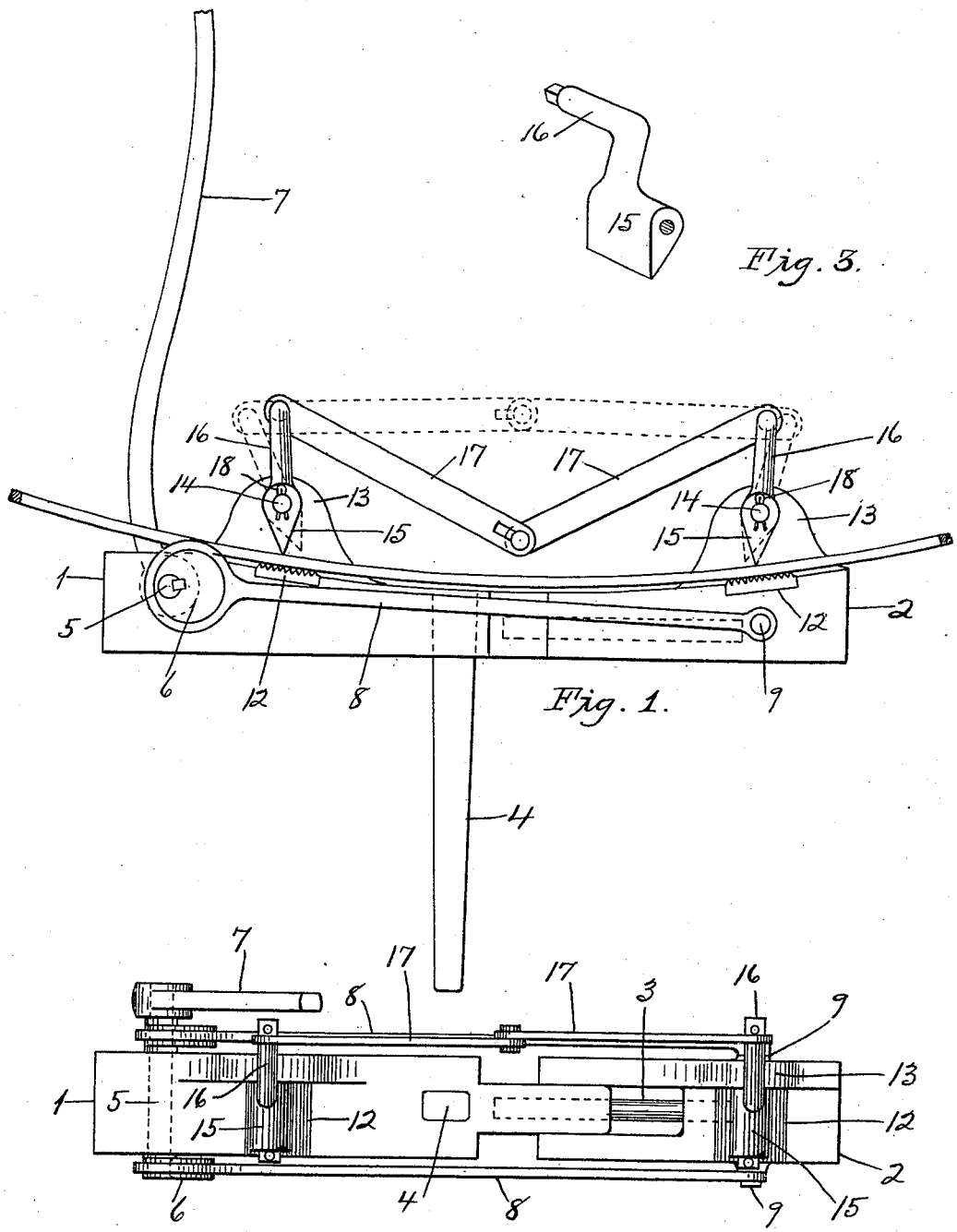
WITNESSES:
INVENTORS,
J. H. Thompson and T. P. McCullough
By Higdon & Higdon,
ATT'YS.

UNITED STATES PATENT OFFICE.

JOHN H. THOMPSON AND THOMAS PEPERSON McCULLOUGH, OF NEVADA, MISSOURI.

TIRE-SHRINKER.

SPECIFICATION forming part of Letters Patent No. 684,958, dated October 22, 1901.

Application filed November 27, 1900. Serial No. 37,881. (No model.)

*To all whom it may concern:*

Be it known that we, JOHN H. THOMPSON and THOMAS PEPERSON MCCULLOUGH, residing at Nevada, in the county of Vernon and State of Missouri, have invented new and useful Improvements in Tire-Shrinkers, of which the following is a specification.

Our invention relates to tire-shrinkers; and the object of our invention is to produce a tire-shrinker which is simple and compact and which can quickly be mounted on an anvil and removed therefrom when not in use.

With this object in view our invention consists in the novel construction hereinafter described and then claimed, and illustrated in the accompanying drawings, in which—

Figure 1 is a side elevation of our tire-shrinker, showing a portion of a tire in position ready to be acted on by the shrinker. Fig. 2 is a top plan view of the device. Fig. 3 is a perspective view of one of the dogs.

1 and 2 designate two blocks connected by a bar 3, which is firmly secured in one of the blocks and enters slidingly a hole in the other block.

A shank 4, adapted to be inserted in the usual vertical opening in a blacksmith's anvil, is secured to block 1, so that the device when in use rests on the top of the anvil and is held firmly by the shank 4. This shank may also be held by a vise instead of by an anvil. Block 1 is preferably formed with a tongue which fits slidingly within a corresponding slot in block 2. A rotatable shaft 5 passes through block 1 near its outer end. Eccentrics 6 are rigidly secured on this shaft at the sides of block 1, and a hand-lever 7 is also keyed to shaft 5, this lever being shown as partly broken away in Fig. 1. The eccentric-straps are secured to or integral with two pull-bars 8, respectively, said bars being pivotally secured to block 2 at 9 9. When the eccentrics 6 are in the position shown in Fig. 1, the movable block 2 is farthest away from the fixed block 1. In the upper face of each of these blocks a detachable gripping-plate 12, provided with teeth for engaging the tire, is secured in any preferred manner. Each of the blocks 1 2 is provided with an upwardly-extending ear 13. In each ear 13 is secured a transverse stub-shaft 14, on each of which is pivotally mounted a dog 15, having a sharp or pointed lower portion and an upwardly and then laterally extending angular arm 16. A pair of links 17 have their outer ends rigidly secured to the arms 16, respectively, and the inner ends of said links are pivotally secured together, preferably by a pin-and-slot joint. The dogs 15 may be secured on stub-shafts 14 by spring-cotters 18 or any other suitable device.

The operation of the invention is as follows: The hand-lever 7 is raised to about a vertical position. The edges of dogs 15 are raised by raising the links 17 with the finger, and the heated portion of a tire is inserted between the dogs and the gripping-plates 12. The lever 7 is then depressed, and at the same time the weight of the links 17 causes their pivoted ends to descend, and thereby bring the edges of the dogs 15 into contact with the tire. The depression of lever 7 operates the eccentric-rods 8, which pull the block 2 toward block 1. This relative motion between the two blocks causes the dogs 15 to jam tightly against the tire, and their sharp edges bite into the tire, which is thus held while it is compressed by the approaching of the blocks. The tire is released by raising the lever 7 to the position shown in Fig. 1. The function of the links 17 is to cause the edges of dogs 15 automatically to engage the inner face of the tire, as stated above.

Having now fully described our invention, what we claim as new, and desire to secure by Letters Patent of the United States, is—

A tire-shrinker comprising a movable block, bifurcated at one of its ends, a stationary block provided with an extension loosely fitting between the arms of said bifurcated block, a longitudinal guide-bar 3 entering holes in the adjacent portions of said blocks, a depending shank secured to said stationary block, for attachment to a vise or anvil, an upwardly-extending lug on each of said blocks, stub-shafts secured in said lugs, a dog mounted on each of said stub-shafts, each dog having a sharp transverse lower edge for engaging a tire, a lever-arm integral with each of said dogs, a link rigidly secured to one of said lever-arms, and having a longitudinal slot in its opposite end, a similar link rigidly secured to the other lever-arm and connected to the aforesaid link by a pivot-pin passing through said slot, so that the weight of said links causes the dogs simultaneously to engage a tire, a transverse rotatable shaft mounted in said stationary block, eccentrics keyed on the ends thereof, the eccentric-rods being pivotally connected to said movable block, and a hand-lever for operating said eccentrics; all substantially as described.

In testimony whereof we affix our signatures in the presence of two witnesses.

JOHN H. THOMPSON.
THOMAS PEPERSON McCULLOUGH.

Witnesses:
M. L. LANGE,
K. M. IMBODEN.